Patented Oct. 22, 1940

2,219,122

UNITED STATES PATENT OFFICE 2,219,122

PROTECTIVE GLASS

Franz Weidert, Berlin-Schoneberg, and Hans Löffler, Berlin-Lichterfelde, Germany, assignors to Degea Aktiengesellschaft (Auergesellschaft), Berlin, Germany, a corporation of Germany No Drawing. Application May 21, 1937, Serial No. 143,936. In Germany May 25, 1936

16 Claims. (Cl. 106—36.1)

Prior to our present invention, various expedients have been proposed to obtain glasses which reduce or eliminate rays, and particularly ultra-violet rays, liable to produce injurious effects. One type of glass introduced for this purpose contained a considerable addition of neodymium, as neodymium oxide (generally in the form of commercial didymia, about 60% of which consists of neodymium oxide, $Nd_2O_3$). Besides the protective effect referred to above, such glasses containing a considerable proportion of neodymium have the valuable advantage that objects viewed through them exhibit richer color contrasts, that is, red, green and blue appear intensified or more vivid. The absorption obtained with protective glasses of this type as made hitherto, was insufficient for some purposes. Even if it were practicable to introduce neodymium into the glass in extremely high concentration, the absorption would still remain relatively slight in the ultra-violet region. Efficient absorption in that region is however indispensable when the glass is to be used for aviator's goggles, snow-glasses, etc. It would indeed be possible, by an addition of cerium (in the form of cerium oxide), to increase the absorption within the ultra-violet region. Even this would not be sufficient for the purposes mentioned above. Furthermore, the addition of cerium will not reduce the amount of visible light transmitted through the glass.

The object of our invention is to increase the total absorption of light, that is to say, not only to absorb the invisible ultra-violet rays effectively, but also to damp or tone down the transmission of the visible light rays. For instance, the absorption of the ultra-violet rays may be substantially complete, and the visible light may be reduced by absorption to, for example, 30% of its original amount.

In order to obtain these results, we employ glass containing oxides of neodymium, of vanadium, and oxides of certain additional metals which correct the disagreeable greenish tint observed when vanadium oxide is incorporated in glass without such corrective additions.

In carrying out our invention, we employ glass containing a relatively high percentage of neodymium oxide, $Nd_2O_3$, that is to say, a percentage sufficient to increase the color contrasts of objects viewed through the glass. Such percentage may range from about 5% to about 50%. The desired absorptive effects are obtained within this entire range. However, there are certain practical difficulties in the manufacture and working of glass containing the higher percentages of neodymium oxide (above 30%), and for this reason the percentage of neodymium oxide used by us ranges generally from about 5% to about 30%.

In addition to the neodymium oxide, our improved glass contains, as an important ingredient, an amount of vanadium (as vanadium oxide, preferably the pentoxide, $V_2O_5$) sufficient to produce the desired results, that is, an extremely strong absorption of light in the ultra-violet region and simultaneously a damping or toning down in the region of the visible light. It has been found that if this double effect is to be obtained by the addition of vanadium to glass containing a relatively high percentage of neodymium oxide, a fairly high proportion of vanadium (for instance, as $V_2O_5$) must be employed, say from about 0.3% to about 3%. While this will produce the desired strong absorption in the ultra-violet region and a reduction of the perviousness of the glass to visible rays, it is accompanied by the production of a greenish stain or tint, owing to the fact that the green tint due to the addition of vanadium oxide is sufficiently powerful to overcome or outweight the violettish tint given to the glass by the neodymium oxide. The greenish tint which the glass assumes when it contains both neodymium and vanadium in the relatively high proportions mentioned above, gives the glass an unpleasant appearance. Furthermore, such glass no longer intensifies with substantially uniform strength, all the colors viewed therethrough, lacking therefore this property which is possessed by glass containing neodymium oxide but no vanadium oxide. We may add that glass containing vanadium but no neodymium has a very pronounced unpleasant greenish tint and lacks the uniform strengthening of the colors just referred to above.

We have endeavored to produce a glass containing both neodymium oxide and vanadium oxide yet free from the detrimental and disturbing secondary effects of vanadium which have been pointed out above. That is to say, we have sought for a remedy that would remove or neutralize the greenish tint due to the presence of vanadium, give the glass an agreeable neutral grayish or bluish-gray tint, and preserve the contrast-heightening effect due to the presence of neodymium. It might have been assumed that such a remedy would be afforded by adding some coloring matter which, considered by itself, would impart a purplish tint to the glass. We found, however, that among the various oxides which are known as coloring or tinting ingredients in the manufacture of glass, there is no single oxide which by itself alone will have the desired effect of imparting a purplish tint to the glass, and the addition of which will correct the undesirable effects of the addition of vanadium.

As a result of our investigations, we found that the desired effect can be obtained by adding to a glass of the character described (containing neodymium and vanadium), a mixture of two ingredients, one constituted by a cobalt compound, for instance the oxide $Co_3O_4$, and the other by a nickel compound, for instance the oxide NiO, or a manganese compound, for instance the sesquioxide $Mn_2O_3$. This nickel oxide, considered by itself, reduces the transmission of light within the entire range of the spectrum, but its weakening or absorbing action is least in the region of red rays, so that the transmission of red is favored over that of other colors. The weakening within the entire range of the spectrum is of great importance for the purposes of our present invention, because we desire not only to suppress the transmission of ultra-violet rays completely or nearly so, but also to damp the light, or absorb a portion thereof, throughout the region of visible light. Cobalt oxide gives the glass a bluish tint, but at the same time permits substantial amounts of red to pass through. Neither nickel oxide nor cobalt oxide will cut off or even excessively weaken that end of the spectrum opposite to the portion corresponding to the light the transmission of which is favored, and thus we preserve the property of strengthening, as uniformly as possible, all the colors of the objects viewed, which property is possessed by the protective glasses mentioned at the beginning of this specification.

The addition of cobalt oxide, if made in suitable amounts, has the further advantage of giving the entire glass a bluish-gray tint which is particularly agreeable to the eyes.

As stated above, a mixture of manganese oxide (preferably the sesquioxide, $Mn_2O_3$) and cobalt oxide may be substituted for the mixture of nickel oxide and cobalt oxide; or we may employ mixtures containing cobalt oxide, nickel oxide, and manganese oxide. In each case, the useful results explained above will be obtained.

As to the proportions of the oxides just mentioned, these may be varied according to circumstances. As a rule, the proportion of cobalt oxide will be within the range of about 0.005% to about 0.05%, that of nickel oxide from about 0.05% to about 0.4%, and that of manganese oxide from about 0.05% to about 0.3%.

Three typical examples of glasses according to our invention are composed as follows:

|  | A | B | C |
| --- | --- | --- | --- |
|  | Per cent | Per cent | Per cent |
| Silica, $SiO_2$ | 61.6 | 68.2 | 66.5 |
| Arsenic oxide, $As_2O_3$ | 0.2 |  | 0.2 |
| Vanadium oxide, $V_2O_5$ | 1.8 | 1.2 | 1.23 |
| Commercial didymium oxide | 18.2 | 18.8 | 14.6 |
| Potassium oxide, $K_2O$ | 4.0 | 4.2 | 4.3 |
| Sodium oxide, $Na_2O$ | 11.5 | 10.0 | 10.5 |
| Boron oxide, $B_2O_3$ | 2.5 | 2.5 | 2.6 |
| Manganese oxide, $Mn_2O_3$ | 0.1 |  |  |
| Cobalt oxide, CoO | 0.01 | 0.008 | 0.007 |
| Nickel oxide, NiO |  | 0.1 | 0.11 |
|  | 99.91 | 100.008 | 100.047 |

In the three examples, shown above, the "commercial didymium oxide" contains about 60% neodymium oxide, so that the amount of such oxide ($Nd_2O_3$) in the glasses amounts to 10.92%, 11.28% or 8.76% respectively.

Each of these three glasses, A, B, and C has a neutral gray or bluish gray tint, has the same color-strengthening or contrast-heightening effects as neodymium glass of the prior art, absorbs ultra-violet light with practical completeness, and damps the visible light to about 30% of its original amount.

Various modifications may be made without departing from the nature of our invention as set forth in the appended claims.

We claim:

1. A protective glass containing from about 5% to about 50% of neodymium oxide and an addition of vanadium oxide.

2. A protective glass containing from about 5% to about 50% of neodymium oxide and from about 0.3 to about 3% of vanadium oxide.

3. A protective glass containing from about 5% to about 30% of neodymium oxide and an addition of vanadium oxide.

4. A protective glass containing from about 5% to about 30% of neodymium oxide and from about 0.3% to about 3% of vanadium oxide.

5. A protective glass containing neodymium oxide, vanadium oxide, cobalt oxide, and the oxide of a metal selected from the group composed of nickel and manganese.

6. A protective glass containing neodymium oxide, vanadium oxide, cobalt oxide, and nickel oxide.

7. A protective glass containing neodymium oxide, vanadium oxide, cobalt oxide, and manganese sesquioxide.

8. A protective glass containing from about 5% to about 50% of neodymium oxide, from about 0.3% to about 3% of vanadium oxide, from about 0.005% to about 0.05% of cobalt oxide, and from about 0.05% to about 0.4% of nickel oxide.

9. A protective glass containing from about 5% to about 50% of neodymium oxide, from about 0.3% to about 3% of vanadium oxide, from about 0.005% to about 0.05% of cobalt oxide, and from about 0.05% to about 0.3% of manganese sesquioxide.

10. A protective glass containing from about 5% to about 50% of neodymium oxide, from about 0.3% to about 3% of vanadium oxide, from about 0.005% to about 0.05% of cobalt oxide, from about 0.05% to about 0.4% of nickel oxide, and from about 0.05% to about 0.03% of manganese sesquioxide.

11. A protective glass containing from about 5% to about 30% of neodymium oxide, from about 0.3% to about 3% of vanadium oxide, cobalt oxide, and the oxide of a metal selected from the group composed of nickel and manganese.

12. A protective glass containing neodymium oxide in a proportion which by itself would give the glass a violettish tint and which is sufficient to increase the color contrasts of objects viewed through the glass, vanadium oxide in a proportion sufficient to overcome such violettish tint and to give the glass a greenish tint, and a neutralizing addition to overcome such greenish tint and to give the glass a bluish-gray tint, said addition containing cobalt oxide and the oxide of a metal selected from the group composed of nickel and manganese.

13. A protective glass containing neodymium oxide in a proportion which by itself would give the glass a violettish tint and which is sufficient to increase the color contrasts of objects viewed through the glass, vanadium oxide in a proportion sufficient to overcome such violettish tint and to give the glass a greenish tint, and a neutralizing addition to overcome such greenish tint and to give the glass a bluish-gray tint, said addition containing cobalt oxide and nickel oxide.

14. A protective glass containing neodymium oxide in a proportion which by itself would give the glass a violettish tint and which is sufficient to increase the color contrasts of objects viewed through the glass, vanadium oxide in a proportion sufficient to overcome such violettish tint and to give the glass a greenish tint, and a neutralizing addition to overcome such greenish tint and to give the glass a bluish-gray tint, said addition containing cobalt oxide and manganese sesquioxide.

15. A protective glass containing neodymium oxide in a proportion which by itself would give the glass a violettish tint and which is sufficient to increase the color contrasts of objects viewed through the glass, vanadium oxide in a proportion sufficient to overcome such violettish tint and to give the glass a greenish tint, and a neutralizing addition to overcome such greenish tint and to give the glass a bluish-gray tint, said addition containing cobalt oxide, nickel oxide, and manganese sesquioxide.

16. A protective glass containing from about 5 to 50% of neodymium oxide, an amount of vanadium oxide corresponding to about from 10 to 14% of the neodymium oxide content, an amount of cobalt oxide corresponding to about at least 0.5% of the vanadium oxide content, and an addition consisting of the oxide of a metal selected from the group consisting of nickel and manganese, said addition amounting to from about 5 to 9% of the vanadium oxide content.

FRANZ WEIDERT.
HANS LÖFFLER.